(12) United States Patent
McDonough et al.

(10) Patent No.: US 7,403,507 B2
(45) Date of Patent: Jul. 22, 2008

(54) SYSTEM AND METHOD FOR RECOVERING SYSTEM TIME IN DIRECT SEQUENCE SPREAD SPECTRUM COMMUNICATIONS

(75) Inventors: John G. McDonough, La Jolla, CA (US); Juncheng C. Liu, San Diego, CA (US); Yan Hui, San Diego, CA (US); Chunhao Chen, San Diego, CA (US)

(73) Assignee: Texas Instruments Incorporated, Dallas, TX (US)

( * ) Notice: Subject to any disclaimer, the term of this patent is extended or adjusted under 35 U.S.C. 154(b) by 1324 days.

(21) Appl. No.: 09/883,740

(22) Filed: Jun. 18, 2001

(65) Prior Publication Data

US 2003/0043766 A1 Mar. 6, 2003

(51) Int. Cl.
*H04B 7/216* (2006.01)
(52) U.S. Cl. .................. 370/335; 370/395.62; 375/130; 375/145; 455/343.4
(58) Field of Classification Search ................. 370/311, 370/335, 252, 342; 455/574, 502; 375/335, 375/145, 149; 327/156; 713/322; 377/28
See application file for complete search history.

(56) References Cited

U.S. PATENT DOCUMENTS

| | | | |
|---|---|---|---|
| 5,097,490 A * | 3/1992 | Hulsing et al. ................. 377/28 |
| 5,392,287 A | 2/1995 | Tiedemann, Jr. et al. |
| 5,491,718 A * | 2/1996 | Gould et al. ................. 370/335 |
| 5,642,377 A * | 6/1997 | Chung et al. ................. 375/145 |
| 5,790,589 A | 8/1998 | Hutchison, IV et al. |
| 6,016,312 A * | 1/2000 | Storm et al. ................. 370/311 |
| 6,101,173 A | 8/2000 | Bayley |
| 6,147,530 A * | 11/2000 | Nogawa ..................... 327/156 |
| 6,473,607 B1 * | 10/2002 | Shohara et al. .......... 455/343.1 |
| 6,735,454 B1 * | 5/2004 | Yu et al. ..................... 455/574 |

\* cited by examiner

*Primary Examiner*—David C. Payne
*Assistant Examiner*—Adolf Dsouza
(74) *Attorney, Agent, or Firm*—Wade J Brady, III; Frederick J. Telecky, Jr.

(57) ABSTRACT

A sleep control system and method are provided that permit a reference clock and the direct sequence spread spectrum (DSSS) modem in a mobile station receiver to be turned off and turned back on at arbitrary points in time while still maintaining accurate base station system time. Accurate timing is made possible through a number of techniques including precise initial calibration using a rising edge/falling edge averaging system, determining the sleep clock and reference clock frequencies, and the determination of the frequency drift of the sleep clock that occurred during the previous sleep interval.

42 Claims, 3 Drawing Sheets

SYSTEM AND METHOD FOR RECOVERING SYSTEM TIME IN DIRECT SEQUENCE SPREAD SPECTRUM COMMUNICATIONS

BACKGROUND OF THE INVENTION

1. Field of the Invention

This invention relates generally to spread spectrum communications and, more particularly, to a system and method for a mobile station receiver to efficiently recover system time after its reference clock has been disabled during a sleep interval.

2. Description of the Related Art

During the idle state, a direct sequence spread spectrum (DSSS) base station operates in slotted mode to reduce mobile station standby power consumption. The base station instructs receivers to be turned off for most of the time, and to wake up only periodically to monitor the paging channel for pages and network overhead messages. During the time the receiver is turned off, the mobile station receiver sleep control system can further reduce power consumption by operating with a low frequency sleep clock instead of the high frequency reference clock.

In a DSSS mobile station receiver, code sequences, such as pseudorandom noise (PN) or Gold code sequences, are used in order to maintain time synchronization with the base station. For example, the system compliant with the IS-2000 standard uses a short PN sequence of length $2^{15}$ and a long PN sequence of length $2^{42}-1$. After the mobile station receiver initially acquires the synchronization from the base station, the short and long PN sequences advance periodically based on the mobile station receiver reference clock. An automatic frequency control algorithm and voltage controlled local oscillator are used by the mobile station receiver to maintain a high degree of reference clock accuracy relative to the received (transmitted by the network) signal.

When the mobile station receiver operates in slotted mode and is not monitoring the paging channel, the mobile station receiver is turned off, along with its reference clock that is replaced by a low frequency sleep clock. During this inter-slot period with the reference clock turned off and only the sleep clock running, the short and long PN sequences stop advancing and their states are no longer synchronized to the short and long PN sequences of the base station. After the mobile station receiver wakes up, the states of the short and long PN sequences need to be adjusted to compensate for the loss of system timing during the inter-slot period. The mobile station receiver needs to correctly perform the adjustments before the arrival of its assigned time slot in order to resume receiving the paging channel messages.

Conventionally, the short and long PN sequence adjustments are made by permitting the reference clock to be turned on and off only at certain convenient points. The problem with this method is that the sleep interval becomes fixed to one, or just a few values, and the reference clock must be turned on well before the sleep interval ends to insure sufficient time for synchronization. Thus, the mobile station receiver power conservation is not maximized. The power conservation problem is worsened if the reference clock must be turned on even earlier to compensate for possible errors in the mechanism used to time the sleep interval. The sleep clock drift problem is discussed in greater detail below.

Typically, in a Code Division Multiple Access (CDMA) system, the mobile station receiver must periodically receive paging slots, as determined by a SLOT_CYCLE_INDEX value. The index is selected by the mobile station receiver, except that the network can set the maximum index.

In addition, there exists a certain amount of overhead to receive a slotted page message. Because of continuous convolutional coding on the CDMA paging channel, the mobile station receiver conventionally has to receive at least a frame before the slot, depending on the paging channel data rate. This time, in conjunction with various turn-on times in the mobile station receiver, results in additional overhead. The total duty cycle can be as much as approximately 15.6%, depending on the slot cycle length.

Furthermore, it is possible that the mobile station would be required to receive two paging channel slots. This can occur if the base station uses the MORE_PAGES bit in the SLOTTED PAGE MESSAGE, thereby requiring the mobile station to receive up to one additional slot. Also, the CDMA specification states that the mobile station may stop listening to the paging channel after reading the SLOTTED PAGE MESSAGE. There is no guarantee that this message is located at the beginning of the slot. As a result, it may happen that the mobile station must always listen to the entire slot.

One conventional power-up method reads the state of the long code generator just prior to powering down the mobile station receiver. A complex matrix multiply operation is then applied to the long code to determine the correct state of the long code generator at a time in the future when the long code generator is to be reinitialized.

However, this approach is computationally expensive. As a result, it may be necessary to "WAKE UP" the mobile station receiver earlier than would be necessary if the complex matrix multiply operation is performed after the power down period. If the matrix multiplication is performed before powering down, then the mobile station receiver must remain in a powered up state for a period of time sufficient to accomplish the matrix multiply. In either case, the mobile station receiver is powered on for a longer time. This causes the overall duty cycle and power consumption to increase, thus decreasing battery life.

Regardless of overhead time that must be used in synchronization, additional overhead is required due to calibration errors. The amount of adjustment applied to the short and long PN sequences is in theory a function of the number of reference clocks absent during the inter-slot period. However, this number is not known to the mobile station receiver and has to be estimated based on the relationship between the reference clock and the sleep clock. This relationship can be observed by the mobile station receiver while both clocks are running simultaneously. This relationship, however, varies in time due to external factors such as temperature. A poor estimate results in longer time for the mobile station receiver to perform timing re-acquisition after waking up. An incorrect estimate results in total loss of timing synchronization and the mobile station receiver will not be able to receive valid messages from the paging channel. When this happens, the mobile station receiver has to re-initialize by performing the initial timing acquisition. Both consequences have negative impacts on the mobile station receiver power consumption.

In order to derive an accurate estimate of the missing reference clocks during the inter-slot period, the mobile station receiver has to regularly calibrate the sleep clock frequency based on the reference clock. This sleep clock calibration method requires longer calibration periods and is inherently limited in the accuracy that can be obtained.

Another solution to the problem of sleep clock drift is to use a larger search window when attempting to reacquire the state of the PN code received from the base station. However, the use of a larger search window typically requires a correspondingly longer search time, and results in poorer power conservation results.

It would be advantageous if additional power savings could be realized by a mobile station system during slotted sleep mode.

It would be advantageous if the frequency of the sleep clock could be accurately measured using the reference clock to reduce the resynchronization time.

It would be advantageous if actual frequencies of the reference and sleep clocks, as well as the frequency drift of the sleep clock, could be used as data to reduce the resynchronization time.

SUMMARY OF THE INVENTION

Accordingly, a flexible method is provided for the mobile station receiver to maintain accurate system time information by using the low frequency sleep clock. This invention presents a control system that combines hardware and software approaches to maximize the sleep time in a slotted mode sleep interval.

More particularly, the system comprises a clock system with a reference clock, and PN code generator that can be enabled or disabled, and that is responsive to timing advancement commands. A sleep clock provides a sleep clock signal at a frequency that is less than the reference clock frequency. A controller measures the accuracy of the sleep clock frequency, disables the reference clock during the sleep interval and supplies the timing advancement commands to the PN code generator. After wake-up, the advancement is based primarily upon the ratio of the reference clock frequency to the sleep clock frequency and of the sleep duration.

The controller determines the ratio of the reference clock frequency to the sleep clock frequency, which for simplicity is referred to herein as the ratio. The controller determines the number of sleep clock periods the reference clock is to be disabled by multiplying the sleep interval, times the nominal reference clock frequency, divided by the ratio. After enabling the reference clock, the controller advances the system timing by finding the product of the number of sleep clock periods times the ratio.

A summary of an analytical system is provided above. Further details are provided below in the Detailed Description of the Preferred Embodiments. Also provided below is a discussion of an infinite impulse response (IIR) filter system to determine ratio measurements.

Further, a method for recovering system timing is also provided. The method comprises: measuring the accuracy of the sleep clock frequency; disabling a reference clock during a sleep interval; enabling the reference clock after the sleep interval; advancing the system timing in response to determining the ratio of the reference clock frequency to the sleep clock frequency; and, using the sleep clock frequency drift to calculate the ratio. Advancing the system timing includes finding the product of the number of sleep clock periods and the ratio. Details of this process, and a related IIR process are presented in detail below.

DETAILED DESCRIPTION OF THE PREFERRED EMBODIMENTS

Figure 1:
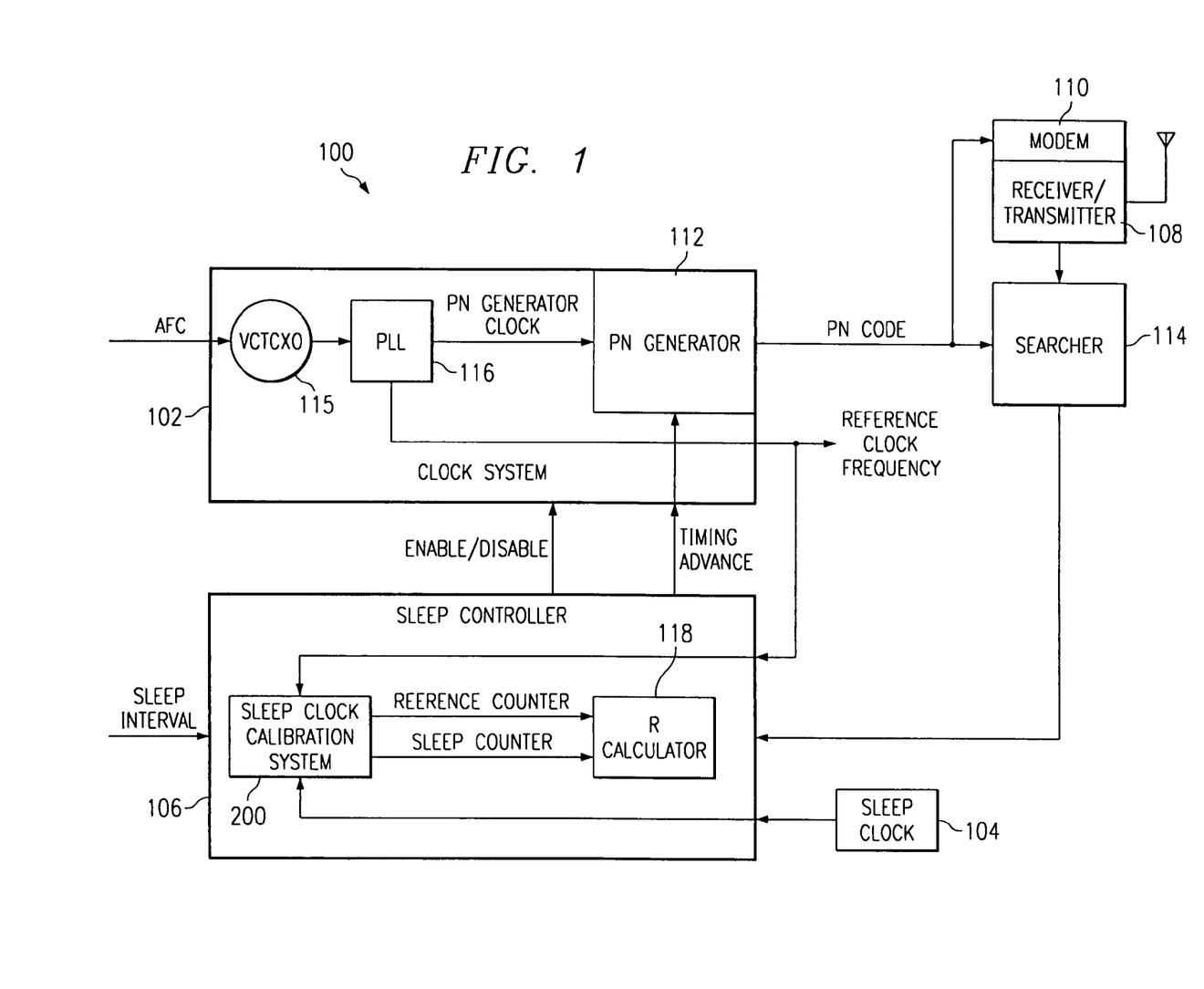
FIG. 1 is a schematic block diagram of the mobile station receiver of the present invention.

FIG. 1 is a schematic block diagram of the mobile station receiver of the present invention. The system 100 comprises a clock system 102, a sleep clock 104, and a sleep controller 106, which will be referred to herein as the controller 106. A transmitter/receiver section 108 transmits and receives radio frequency (RF) DSSS signals. The transmitter/receiver section 108 includes a modem 110. The clock system includes a PN sequence generator 112, with both short and long PN sequence generators to continuously generate the two code sequences for the DSSS modem 110 to modulate and demodulate the baseband signal and for reacquisition. After an initial timing acquisition that is performed by searcher 114, the clock system 102 supplies the PN generator clock signal to advance the short and long PN sequence generators so the states of the short and long PN sequences of the mobile station receiver can become synchronized to those of the base station received by transmitter/receiver section 108. For simplicity, the message spread with PN sequences transmitted by the base station (not shown) are referred to herein as "received PN sequences".

The clock system 102 typically includes a temperature stable voltage controlled temperature compensated oscillator (VCTCXO) 115 and an associated phase-locked loop (PLL) system 116, which may include a plurality of PLLs (not shown), to supply a variety of different frequency signals, such as the PN generator clock, that are used by other components of the mobile station receiver 100. The accuracy of the frequency of the VCTCXO 115 is maintained by an automatic frequency control (AFC) algorithm. The clock system 102 accepts enable and disable commands from the controller 106. When the reference clock is disabled, the VCTCXO 115, PLL 116, and PN sequence generator 112 cease operating, and power is conserved.

Generally, the controller 106 performs the following functions:

1. Commanding of the clock system 102 to synchronously disable the PN generator clock signal to the PN sequence generator 112 and the reference clock frequency before mobile station system 100 enters sleep mode;

2. Synchronous enabling of the clock system before mobile station receiver 100 exits the sleep mode;

3. Commanding the clock system 102 to synchronously enable the PN generator clock signal to the PN sequence generator 112 and the reference clock frequency before mobile station receiver 100 exits the sleep mode; and 4. Providing a measurement of the relationship between the reference clock frequency and the sleep clock frequency.

One primary task of the controller 106 is to determine the ratio of the reference clock frequency to the sleep clock frequency, and to advance the PN sequence in response to the determined ratio. The controller 106 uses the ratio to derive the frequency drift of the sleep clock frequency and, therefore, the actual time asleep.

The controller 106 has an input to accept the sleep interval. The controller 106 determines the number of sleep clock periods in the sleep interval and disables the reference clock for the determined number of sleep clock periods.

Although the controller 106 is depicted as hardware, in some aspects of the invention the controller is a software application of microprocessor executable instructions that are stored in memory. Alternately, the controller 106 includes hardware and software aspects. Before mobile station receiver 100 enters the sleep mode, the controller protocol software and its peer entity base station agree upon the time that mobile station receiver 100 needs to monitor the paging channel. This time determines the duration ($T_{sleep}$) that the mobile station receiver 100 can turn off elements and operate in power saving sleep mode.

The nominal reference clock frequency and the nominal sleep clock frequency are expressed as $f_{ref}$ and $f_{sleep}$ respectively. The actual reference and sleep clock frequencies deviate from the nominal frequencies due to external factors such as temperature and aging. The actual reference clock frequency and the actual sleep clock frequency are expressed as $f_{ref}'$ and $f_{sleep}'$, respectively, and are referred to herein as the reference and sleep clock frequencies (instead of actual reference and sleep clock frequencies). During the wake up period in which both the reference clock and sleep clock are running, the ratio of the reference clock frequency to the actual sleep clock frequency, referred to herein as the ratio, is measured using the sleep controller 106 as follows:

$$R = f_{ref}'/f_{sleep}'.$$

Prior to entering the sleep mode, the controller 106 computes the number of sleep clock periods ($N_{sleep\_clk}$) during $T_{sleep}$ as:

$$N_{sleep\_clk} = \lfloor T_{sleep} \times f_{ref} \times (1/R) \rfloor$$
$$= \lfloor T_{sleep} \times f_{ref} \times (f_{sleep}'/f_{ref}') \rfloor$$

where $\lfloor \ \rfloor$ denotes the least integer operation. The controller 106 programs $N_{sleep\_clk}$ and commands the clock system 102 to stop. Therefore, the PN sequence generator 112 is stopped. After $N_{sleep\_clk}$ periods of sleep clock, the controller 106 enables the clock system 102. Enabling and disabling of the clock system 102 is synchronized to either the rising or falling edge of the sleep clock 104. During $N_{sleep\_clk}$ sleep clock periods, the mobile station receiver's PN sequences are frozen. Before the modem 110 can be re-enabled, the controller 106 needs to compute the advancement of the short and long PN states, from the time the modem 110 was previously disabled, to the time the modem 110 is to be enabled. The controller 106 loads the new states into the PN sequence generator 112, or supplies timing information sufficient for the PN sequence generator 112 to determine the current PN state. The amount of advancement is given by $$N_{ref\_clk\_adj} = \lfloor N_{sleep\_clk} \times R \rfloor$$
$$= \lfloor \lfloor T_{sleep} \times f_{ref} \times (f_{sleep}'/f_{ref}') \rfloor \times (f_{ref}'/f_{sleep}') \rfloor$$

$N_{ref\_clk\_adj}$ is therefore an estimate of the number of reference clocks missing during the period of $T_{sleep}$. Note that PN generator 112 operates at a PN generator clock rate and the states, or phases, of the short and long PN sequences are in unit of chips.

As described above, the ratio R varies in time due to external factors. The controller 106 includes a sleep clock calibration subsystem that the controller 106 uses periodically to measure the relationship between the reference clock frequency and sleep clock frequency.

Figure 2:
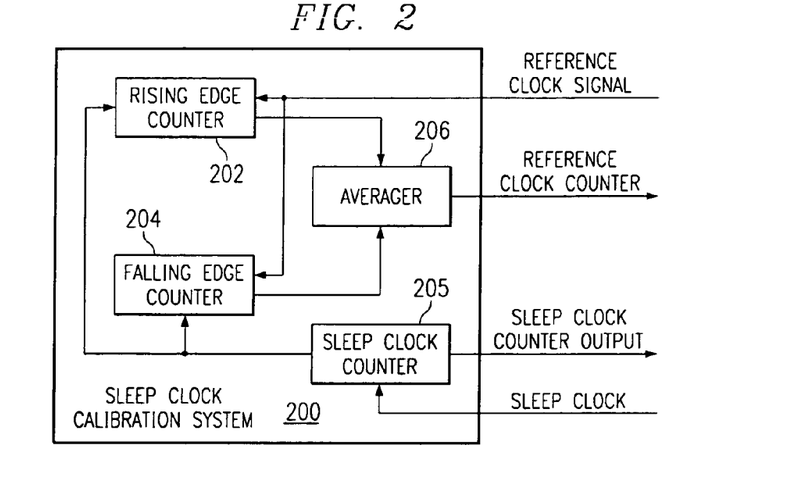
FIG. 2 is a schematic block diagram of the sleep clock calibration system of FIG. 1.

FIG. 2 is a schematic block diagram of the sleep clock calibration system 200 of FIG. 1. Although depicted as hardware blocks, the calibration system 200 can include software elements, or can be entirely enabled in software. The main functionality of the calibration subsystem is to provide data for an improved ratio R.

Obviously, the key of the calibration is to make the ratio $R = f_{ref}'/f_{sleep}'$ as accurate as possible. This makes $N_{ref\_clk\_adj}$, which is ultimately converted into adjusted PN sequence states, accurate enough such that the re-acquisition requires a relatively short searching time by requiring a smaller research window.

There are two sources resulting in the errors in the calculation of the ratio R. First, the quantization error due to the short calibration (counting) time. This error can be minimized by using very long calibration (counting) time. However, a longer calibration time means a shorter sleep time and, therefore, less power efficiency. Second, errors in determining the ratio result from the frequency drift of the sleep clock. The longer the sleep time is, the greater $f_{sleep}'$ can vary. This results in an inaccurate adjustment of PN sequence states.

To reduce the quantization error, especially in a relatively short calibration time, a two-edge counting method is proposed. As illustrated in FIG. 2, a rising edge counter 202 and a falling edge counter 204 are used to count, respectively, the rising edge and the falling edge of the reference clock signal in response to the sleep clock counter 205. The reference clock counts are then averaged, using averager circuit 206, and the reference clock average is output to ratio calculator 118 (see FIG. 1), where the averaged ratio is calculated. The averaged ratio is calculated by the controller 106 using the average of the reference clock count and sleep clock count as follows:

$$R = (N_{ref\_rising} + N_{ref\_falling})/2 * N_{sleep}$$

The two-edge counting method can significantly reduce the quantization error when the calibration time is relatively short. When the calibration is long enough, quantization error is almost completely eliminated, as the two-edged calibration value converges to the true value. It should be noted that this counting method can be potentially used in calibration systems other than the above-mentioned example.

Once an accurate ratio R is found, the number of sleep clocks, $N_{sleep\_clk}$, required in the next sleep period $T_{sleep}$, and the number of reference clocks, $N_{ref\_clk\_adj}$, that will elapse during $T_{sleep}$, can be found with greater certainty.

Returning to FIG. 1, an analytical calibration technique is presented that uses the system 100. The detailed description is as follows:

1. A initial calibration is performed with a sufficiently long period to remove most of the quantization error. Typically, the calibration system 200 is used to find the averaged ratio. Then, the averaged ratio is used as the initial value of R. The controller 106 calculates $N_{sleep\_clk}$ which is used to determine the reference clock turn-off time for the sleep interval.

2. In order to track the sleep clock frequency drift with respect to the nominal sleep clock frequency, the relationship between the ratio R and the sleep clock frequency drift $\Delta f_{sleep}$ can be established as follows:

$$\Delta f_{sleep} = f(R, f_{sleep}, f_{ref}).$$

Given nominal frequencies $f_{sleep}$ and $f_{ref}$, the function can be represented as:

$$\Delta f_{sleep} = f_{ref}/(f_{sleep} R) - 1.$$

Since $\Delta f_{sleep}$ is very small compared to $f_{sleep}$ and $f_{ref}$, the non-linear function can be well approximated by:

$$\Delta f_{sleep}=(R-r_0)/b$$

where $r_0$ and $b$ are constants. $\Delta f_{sleep}$ is calculated and tracked using this relationship.

3. Upon wake-up, the PN sequences are adjusted according to $N_{ref\_clk\_adj}$. $N_{ref\_clk\_adj}$ is computed based on the actual sleep duration and R calculated from the previous calibration period. The PN code sequence generator 112 operates at a PN generator clock rate, proportionally related to the reference clock frequency. The controller 106 advances the system timing by shifting the phase of the PN code sequence. The searcher 114 accepts the PN sequence from PN sequence generator 112 and a received PN code sequence. The searcher 114 reacquires the system time using the received PN code sequence and the shifted PN code sequence, and supplies a measure of the reacquisition error to a third input of the controller 106. The controller 106 modifies the sleep clock frequency drift in response to the reacquisition error.

More specifically, re-acquisition is performed using a fixed window size. According to the offset between the center of the searching window and correct timing position, $\delta c$, sleep clock frequency drift during the previous sleep period $T_{sleep}$ can be obtained. According to the offset between the center of the searching window and correct timing position, $\delta c$, reported by the seacher 114 to an input of the controller 106, the sleep clock frequency drift during the previous sleep period $T_{sleep}$ can be obtained by $\Delta f_{sleep}=f(\delta c)$. It can be approximated by a linear function as follows:

$$\Delta f_{sleep}=(\delta c-c_0)/d$$

where $c_0$ and $d$ are constants. Theoretically, $c_0$ should be 0. $d$ is the slope of $\Delta f_{sleep}$ vs. $\delta c$ and it has a dependency on sleep time $T_{sleep}$. For a given $T_{sleep}$, $d$ can be obtained. For a variable sleep time, one can either use different $d$ for different sleep time or use an averaged $d$.

4. $\Delta f_{sleep}$ is added to the accumulated sleep clock frequency drift to obtain the sleep clock frequency drift with respect to the sleep clock nominal frequency $\Delta f_{sleep}$. By using $\Delta f_{sleep}=f(R)$ again, the ratio R is obtained from the new $\Delta f_{sleep}$. Again, $\Delta f_{sleep}=(R-r_0)/b$ can be used to obtain R under reasonable assumptions.

Note that the above equations can be well approximated by $y=ax+b$. As a result, only two coefficients per equation need to be stored in the implementation.

The system of FIG. 1 can also be used to implement an infinite impulse response (IIR) filter aspect of the invention. As with the analytical technique, a relatively long calibration period, sufficiently long to remove most of the quantization error, is first performed. During each wake-up period, a new ratio R is calculated using the system illustrated in FIG. 2 during a short calibration period. An IIR filter is applied to the current and to the previous reference-to-sleep clock ratios, smoothing out the noise in R introduced by both quantization error and frequency drift. Then, the number of sleep clocks required for the next sleep period is calculated. In some aspects of the invention, and plurality of previous R values are used with the current R to determine the ratio.

Generally, the controller 106 advances the system timing by the product of the sleep interval and the ratio, and the controller 106 determines the ratio in response to the previous R and the current R. The error in the system timing advance is measured by the searcher 114, and the controller 106 determines the ratio by weighting the importance of current and the previous ratios in response to the reacquisition error.

The detailed description is as follows:

1. A calibration with a sufficiently long period (e.g., one second) for removing most of the quantization error is first performed, using the calibration system of FIG. 2. The reference to sleep clock averaged ratio is calculated using two-edge counting method. $N_{sleep\_clk}$ is also calculated. $N_{sleep\_clk}$ is then used by sleep controller 106 to determine reference clock turn-off time for the sleep interval.

2. Upon wake-up, the PN sequences are adjusted according to $N_{ref\_clk\_adj}$. $N_{ref\_clk\_adj}$ is computed based on the sleep duration ($T_{sleep}$) and the R calculated from the previous calibration period. Re-acquisition is then performed using a fixed window size. The ratio R is calculated using two-edge counting method in a short calibration period. The ratio is calculated as:

$$R(n)=\alpha R(n-1)+(1-\alpha)R(calc)$$

where $\alpha$ and $(1-\alpha)$ are the IIR filter coefficients, where R(calc) is the current calculated R from a two edge counting method in a short period, Rn is the current filtered R, and R(n-1) is the previous R.

In some aspects of the invention, the ratio is calculated as:

$$R(n)=\alpha_0 R(calc)+\alpha_1 R(n-1)+\ldots \alpha_p R(n-p)$$

where p represents the number of previous R values used in the calculation, and where $\alpha_0+\alpha_1+\ldots \alpha_p=1$.

There are different ways to determine the IIR filter coefficients. One way is to adaptively update the coefficients using the search results, $\delta c$, from the re-acquisition, i.e. the offset between the center of the searching window and the correct timing position. When the offset is large, it means $N_{ref\_clk\_adj}$ is less accurate, which in turn means the frequency drift of the sleep clock is large during the last sleep interval. Therefore, previously calculated R has a relatively large change. As a result, $\alpha$ should be small. Similarly, it can be concluded that $\alpha$ should be large when the offset is small. Hence, $\alpha$ is inverse proportional to $\delta c$.

Another parameter that can be used for determining filter coefficients is calibration time $T_{cal}$. When $T_{cal}$ is small, the ratio R may have larger error due to the quantization error. As a result, filter coefficients $\alpha$ can be correspondingly weighted.

Figure 3A:
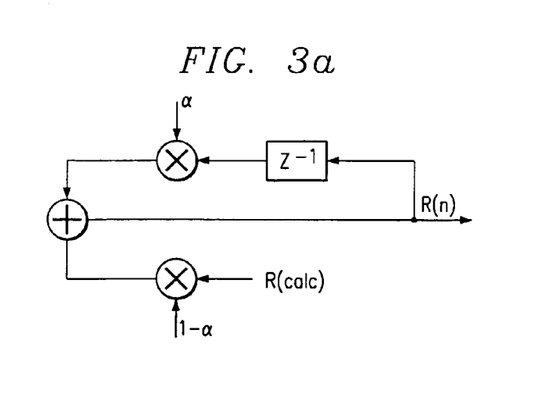
FIG. 3a is a schematic illustrating the R (ratio) calculation process using the IIR based calibration.

FIG. 3a is a schematic illustrating the R (ratio) calculation process using the IIR based calibration. Note that R(n) is initialized using the value from the first calibration result. $Z^{-1}$ represents a unit of delay. Specifically, the calculation represented in FIG. 3a uses the current ratio plus only the most recent previous ratio to determine the new ratio.

Figure 3B:
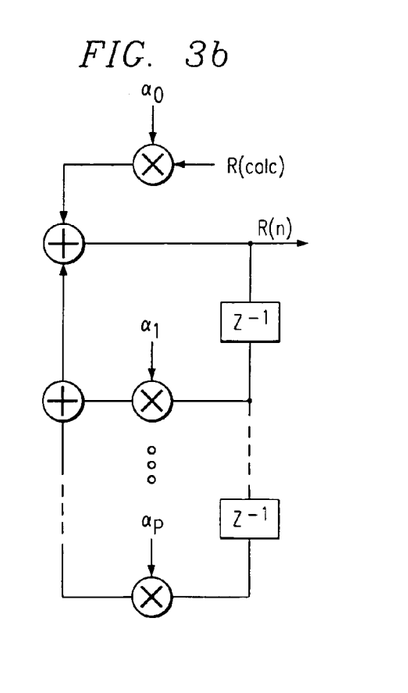
FIG. 3b is a schematic illustrating the R (ratio) calculation process using the IIR based calibration.

FIG. 3b is a schematic illustrating the R (ratio) calculation process using the IIR based calibration. Specifically, the figure depicts a method of using the current ratio plus a plurality of previous ratios to determine the new ratio. It should also be understood that the IIR filter technique may also be used with the analytical technique in the calculation of the new ratio R.

Figure 4:
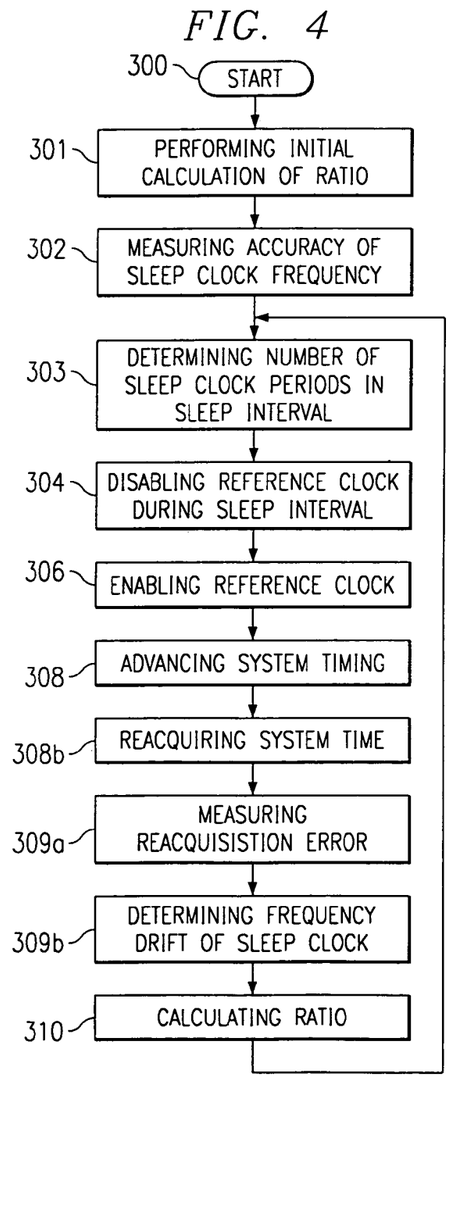
FIG. 4 is a flowchart illustrating an analytical method for recovering system timing in a DSSS communications network.

FIG. 4 is a flowchart illustrating a method for recovering system timing in direct sequence spread spectrum (DSSS) communications. Although the method is depicted as a sequence of numbered steps for clarity, no order should be assumed from the numbering unless explicitly stated. The method begins at Step 300. Step 302 measures the accuracy of the sleep clock frequency. Step 304 disables a reference clock during a sleep interval. Step 306 following the sleep interval, enables the reference clock. Step 308 advances the system timing in response to the ratio, where the ratio is the reference clock frequency divided by the sleep clock frequency. Step 310 calculates the ratio in response to frequency drift of the sleep clock.

In some aspects of the invention, Step 309a measures the reacquisition error. Step 309b determines the frequency drift of the sleep clock. Step 310 calculates the ratio in response to the reacquisition error, as well as the sleep clock frequency drift.

Prior to disabling the reference clock in Step 304, Step 303 determines the number of sleep clock periods in the sleep interval. Disabling reference clock during the sleep interval in Step 304 includes disabling the reference clock for the determined number of sleep clock periods.

Determining the number of sleep clock periods in the sleep interval in Step 303 includes determining the number of sleep clock periods using the ratio.

In some aspects of the invention, the sleep clock and reference clock have nominal frequencies. Determining the number of sleep clock periods in the sleep interval in Step 303 includes multiplying the sleep interval, times the nominal reference clock frequency, times the inverse of the ratio.

Determining the number of sleep clock periods in the sleep interval in Step 303 includes rounding the number of sleep periods down to an integer value of sleep clock periods.

Advancing the system timing includes advancing the system timing in Step 308 by the product of the number of sleep clock periods in the sleep interval and the ratio.

In some aspects of the invention, Step 308 also includes advancing the system timing by rounding down the product of the number of sleep clock periods and the ratio.

In some aspects of the invention, Step 301 performs an initial calculation of the ratio over an extended period of time. Performing an initial calculation in Step 301 includes calculating the ratio by averaging the number of rising and falling edges in a reference clock signal to determine an averaged ratio.

Determining the drift of the sleep clock frequency during the sleep interval in Step 309b includes approximating the sleep clock frequency drift with a linear function including the ratio.

Determining the drift of the sleep clock in Step 309b further includes adding the frequency drift during the last sleep interval to the accumulated sleep clock frequency drift to obtain the sleep clock frequency drift with respect to the nominal sleep clock frequency.

In some aspects of the invention, a received PN code sequence is accepted in the DSSS communications. In Step 308 advancing the system timing includes shifting the phase of the PN code sequence. Following the shifting of the phase of the PN code sequence, Step 308b reacquires the system time using the received PN code sequence and the shifted PN code sequence. Following the measuring of the reacquisition error, the sleep clock frequency drift determination is modified in response to the reacquisition error (Step 309b).

Measuring the reacquisition error in Step 309a includes measuring the offset between the center of a searching window and correct timing position. In some aspects of the invention, Step 309b calculates the sleep clock frequency drift during the previous sleep period with a linear approximation using the offset between the center of the search window and the correct timing position as described in detail above.

Figure 5:
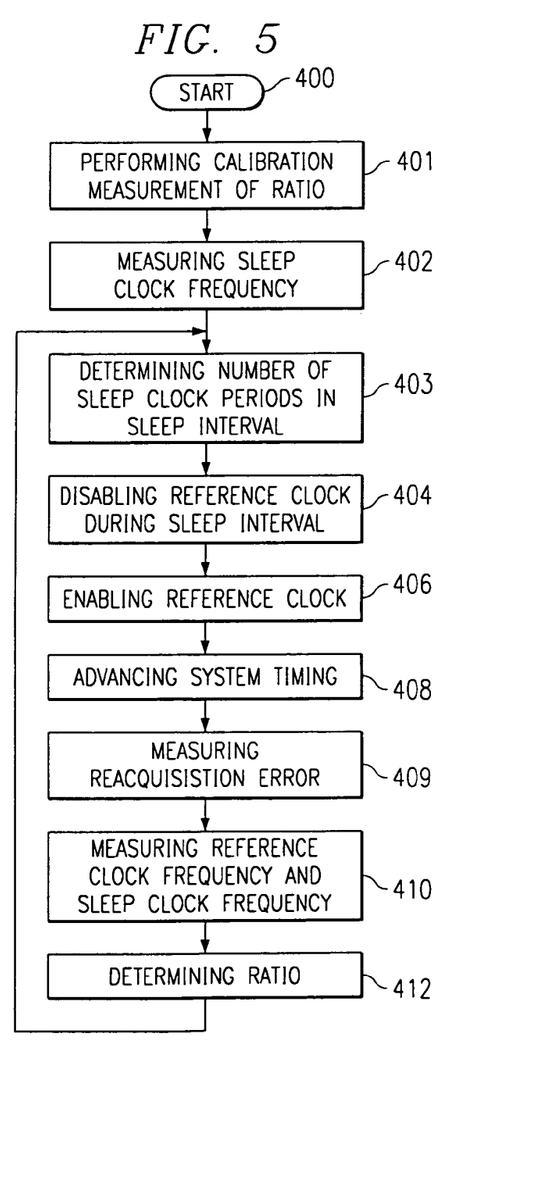
FIG. 5 is a flowchart illustrating an IIR method for recovering system timing in DSSS communications.

FIG. 5 is a flowchart illustrating, in direct sequence spread spectrum (DSSS) communications, a method for recovering system timing. The method begins at Step 400. Step 402 measures the sleep clock frequency using an initial ratio. Step 404 disables a reference clock during a sleep interval. Step 406, following the sleep interval, enables the reference clock. Step 408 advances the system timing in response to the ratio. Step 410 measures the reference clock frequency and the sleep clock frequency to supply a current ratio. Step 412 determines a ratio in response to a previous ratio and the current ratio.

Step 409 measures the reacquisition error. Determining the ratio in response to the previous ratio and the current ratio in Step 410 includes weighting the importance of the current ratio and previous ratio in response to the reacquisition error.

Step 401 performs a calibration measurement of the ratio over an extended period of time. Measuring the sleep clock frequency using the initial ratio in Step 402 includes using the ratio measured over an extended period of time as the initial ratio.

In some aspects of the invention, the sleep interval is included. Step 403 determines the number of sleep clock periods in the sleep interval. Disabling the reference clock frequency during the sleep interval in Step 404 includes disabling the reference clock for the determined number of sleep clock periods.

In some aspects of the invention, determining the number of sleep clock periods in the sleep interval in Step 403 includes determining the number of sleep clock periods using the ratio.

In some aspects of the invention, measuring the current ratio in Step 410 includes averaging the number of rising and falling edges in the reference clock frequency, to determine an averaged ratio. Measuring the current ratio in Step 410 includes using the averaged ratio.

Some aspects of the invention include steps in which the sleep clock and reference clock have nominal frequencies. Determining the number of sleep clock periods in the sleep interval in Step 403 includes multiplying the sleep interval times the nominal reference clock frequency, times the inverse of the ratio as previously described in detail.

In some aspects of the invention, determining the number of sleep clock periods in the sleep interval in Step 403 includes rounding the number of sleep periods down to an integer value of sleep clock periods.

In some aspects of the invention, advancing the system timing by the product of the number of sleep clock periods and the ratio in Step 408 includes finding the product using the formulas described in detail above.

In some aspects of the invention, advancing the system timing by the product of the number of sleep clock periods and the ratio in Step 408 includes rounding the product down to an integer value.

In some aspects of the invention a further step is included. Step 412 determines the ratio in response to a plurality of previous ratios and the current ratio.

This invention presents a sleep control system using the combination of software and hardware approaches. It allows the reference clock and the DSSS modem in the mobile telephone system to be turned off and turned back on at arbitrary points in time while still maintaining accurate mobile telephone network system time. It is accomplished by using accurate sleep clock calibration methods and a software method to facilitate advancing PN sequence of extremely long length by an arbitrary number of states.

Compared to the traditional methods, the proposed calibration approaches have the advantages of longer sleep time with a given search window size, very small calibration time during each wakeup time with very small or no clock counting, and less complexity in calibration. All of them directly contribute to smaller power consumption of a mobile phone system.

Using the analytical technique, no clock counting is required except the first calibration due to the nature of analytical approach, which reduces calibration time. Under reasonable assumptions, the calculation of R, $N_{sleep\_clock}$ and $N_{ref\_clk\_adj}$ are approximated by simple linear relationships. Since it utilizes the results from the re-acquisition as a feedback in the new calculation, for a given sleep time, the search window size is smaller and for given search window size, the sleep time can be longer.

Using the IIR, only a short clock counting is required after the first calibration. Since it utilizes the results from the current and previous calibration to compute R, the accuracy of the results is improved by choosing appropriate filter coefficients. However, other variations and embodiments will occur to others skilled in the art.

What is claimed is:

1. In direct sequence spread spectrum (DSSS) communications, a method for recovering system timing, the method comprising:
   disabling a reference clock during a sleep interval;
   following the sleep interval, enabling the reference clock; and
   modifying the system timing by a ratio, where the ratio is the reference clock frequency divided by a sleep clock frequency wherein the ratio is adjusted for frequency drift;
   measuring a reacquisition error;
   wherein calculating the ratio includes calculating the ratio in response to the reacquisition error; and
   wherein the ratio is further adjusted by an average of a number of rising and falling edges of the reference clock.

2. In direct sequence spread spectrum (DSSS) communications, a method for recovering system timing, the method comprising:
   disabling a reference clock during a sleep interval;
   following the sleep interval, enabling the reference clock;
   advancing the system timing by a ratio, where the ratio is a nominal reference clock frequency divided by a nominal sleep clock frequency;
   calculating the ratio in response to frequency drift of the sleep clock;
   measuring a reacquisition error wherein calculating the ratio includes calculating the ratio in response to the reacquisition error;
   determining the frequency drift of the sleep clock;
   determining the number of sleep clock periods using the ratio in the sleep interval prior to disabling the reference clock wherein disabling the reference clock during the sleep interval includes disabling the reference clock for the determined number of sleep clock periods; and
   wherein determining the number of sleep clock periods in the sleep interval includes multiplying the sleep interval, times the nominal reference clock frequency, times the inverse of the ratio as follows:

$$N_{sleep\_clk} = T_{sleep} \times f_{ref} \times (1/R) = T_{sleep} \times f_{ref} \times (f_{sleep}'/f_{ref}').$$

3. The method of claim 2 wherein determining the number of sleep clock periods in the sleep interval includes rounding the number of sleep periods down to an integer value of sleep clock periods.

4. The method of claim 2 wherein advancing the system timing includes advancing the system timing by a product of the number of sleep clock periods in the sleep interval and the ratio as follows:

$$N_{ref\_clk\_adj} = N_{sleep\_clk} \times R = T_{sleep} \times f_{ref} \times (f_{sleep}'/f_{ref}') \times (f_{ref}'/f_{sleep}').$$

5. The method of claim 4 wherein advancing the system timing by the product of the number of sleep clock periods and the ratio includes rounding the product down.

6. The method of claim 4 further comprising:
   performing an initial calculation of the ratio over an extended period of time.

7. The method of claim 6 wherein performing an initial calculation includes calculating the ratio by averaging the number of rising and falling edges in a reference clock signal to determine an averaged ratio.

8. The method of claim 4 wherein determining the drift of the sleep clock frequency during the sleep interval includes approximating the sleep clock frequency drift with a linear function including the ratio as follows:

$\Delta f_{sleep} = (R - r_0)/b$ where the $r_0$ and $b$ are constants.

9. The method of claim 8 wherein determining the drift of the sleep clock includes adding the frequency drift during the last sleep interval to the accumulated sleep clock frequency drift to obtain the sleep clock frequency drift with respect to the nominal sleep clock frequency.

10. The method of claim 9 in which a received PN code sequence is accepted in the DSSS communications;
    wherein advancing the system timing includes shifting the phase of the PN code sequence; and
    the method further comprising:
    following the shifting of the phase of the PN code sequence, reacquiring the system time using the shifted PN code sequence and the received PN code sequence; and
    wherein, following the measuring of the reacquisition error, modifying the sleep clock frequency drift determination is modified in response to the reacquisition error.

11. The method of claim 10 wherein measuring the reacquisition error includes measuring the offset between the center of a searching window and correct timing position, δc; and
    wherein determining the sleep clock frequency drift includes calculating the sleep clock frequency drift during the previous sleep period $T_{sleep}$ with a linear approximation of the function $\Delta f'_{sleep} = f(\delta c)$, as follows:

$\Delta f'_{sleep} = (\delta c - c_0)/d$ where $c_0$ and d are constants.

12. In direct sequence spread spectrum (DSSS) communications, a method for recovering system timing, the method comprising:
    measuring sleep clock frequency using an initial ratio;
    disabling a reference clock during a sleep interval; following the sleep interval, enabling the reference clock;
    advancing the system timing in response to the ratio;
    measuring the reference clock frequency and the sleep clock frequency to supply a current ratio;
    determining a ratio in response to a previous ratio and the current ratio;
    measuring the reacquisition error; and
    wherein determining the ratio in response to the previous ratio and the current ratio includes weighting the importance of the current ratio and previous ratio in response to the reacquisition error.

13. The method of claim 12 further comprising:
    performing a calibration measurement of the ratio over an extended period of time; and
    wherein measuring the sleep clock frequency using the initial ratio includes using the ratio measured over an extended period of time as the initial ratio.

14. The method of claim 13 in which the sleep interval is provided;
the method further comprising:
determining the number of sleep clock periods in the sleep interval; and
wherein disabling the reference clock frequency during the sleep interval includes disabling the reference clock for the determined number of sleep clock periods.

15. The method of claim 14 wherein determining the number of sleep clock periods in the sleep interval includes determining the number of sleep clock periods using the ratio.

16. The method of claim 15 wherein measuring the current ratio includes averaging the number of rising and falling edges in the reference clock frequency, to determine an averaged ratio; and
wherein measuring the current ratio includes using the averaged ratio.

17. The method of claim 16 in which the sleep clock and reference clock have nominal frequencies;
wherein determining the number of sleep clock periods in the sleep interval includes multiplying the sleep interval times the nominal reference clock frequency, times the inverse of the ratio as follows:

$$N_{sleep\_clk} T_{sleep} \times f_{ref} \times (1/R) = T_{sleep} \times f_{ref} \times (f_{sleep}'/f_{ref}').$$

18. The method of claim 17 wherein determining the number of sleep clock periods in the sleep interval includes rounding the number of sleep periods down to an integer value of sleep clock periods.

19. The method of claim 17 wherein advancing the system timing by the product of the number of sleep clock periods and the ratio includes finding the product as follows:

$$N_{ref\_clk\_adj} = N_{sleep\_clk} \times R = T_{sleep} \times f_{ref} \times (f_{sleep}'/f_{ref}') \times (f_{ref}'/f_{sleep}').$$

20. The method of claim 19 wherein advancing the system timing by the product of the number of sleep clock periods and the ratio includes rounding the product down to an integer value.

21. In direct sequence spread spectrum (DSSS) communications, a method for recovering system timing, the method comprising:
measuring sleep clock frequency using an initial ratio;
disabling a reference clock during a sleep interval; following the sleep interval, enabling the reference clock; advancing the system timing in response to the ratio
measuring the reference clock frequency and the sleep clock frequency to supply a current ratio;
determining a ratio in response to a previous ratio and the current ratio; and
wherein determining the ratio includes determining the ratio in response to a plurality of previous ratios and the current ratio.

22. In direct sequence spread spectrum (DSSS) communications network, a receiver system for recovering system timing, the receiver system comprising:
a clock system having a first output to provide a reference clock signal with a reference clock frequency and a second output to supply a PN code sequence, the clock system having a first input to accept commands to enable and disable the reference clock and a second input to accept system timing advancement commands;
a sleep clock having an output to provide a sleep clock signal with a sleep clock frequency, less than the reference clock frequency; and
a controller having a first input connected to the clock system first output, a second input connected to the sleep clock output, and a third input to receive reacquisition errors, the controller having a first output connected to the first input of the clock system to disable the reference clock during a sleep interval and to enable the reference clock after the sleep interval, the controller having a second output connected to the second input of the clock system to advance the system timing in response to determining the ratio of reference clock frequency and sleep clock frequency.

23. The system of claim 22 further comprising:
a searcher having a first input connected to the clock system output to accept a PN code sequence, a second input to accept a received PN code sequence, the searcher reacquiring the received PN code sequence from the clock system shifted PN code sequence, the searcher having an output to supply measured reacquisition errors.

24. The system of claim 23 wherein the controller uses the reacquisition error to derive the frequency drift of the sleep clock frequency.

25. The system of claim 24 wherein the controller, in response to deriving the frequency drift of the sleep clock, derives the actual time of the sleep interval.

26. The system of claim 25 wherein the controller has a fourth input to accept the sleep interval, the controller determining the number of sleep clock periods in the sleep interval and disabling the reference clock for the determined number of sleep clock periods.

27. The system of claim 26 wherein the controller determines the number of sleep clock periods in the sleep interval by using the ratio.

28. The system of claim 27 wherein a nominal sleep clock frequency and a nominal reference clock frequency are included; and
wherein the controller determines the number of sleep clock periods in the sleep interval by multiplying the sleep interval times the nominal reference clock frequency, times the inverse of the ratio as follows:

$$N_{sleep\_clk} \lfloor T_{sleep} \times f_{ref} \times (1/R) \rfloor = \lfloor T_{sleep} \times f_{ref} \times (f_{sleep}'/f_{ref}') \rfloor.$$

29. The system of claim 28 wherein the controller advances the system timing by finding the product of the number of sleep clock periods times the ratio as follows:

$$N_{ref\_clk\_adj} = \lfloor N_{sleep\_clk} \times R \rfloor = \lfloor \lfloor T_{sleep} \times f_{ref} \times (f_{sleep}'/f_{ref}') \rfloor \times (f_{ref}'/f_{sleep}') \rfloor.$$

30. The system of claim 29 wherein the controller averages the number of rising and falling edges in the reference clock signal over an extended period of time to determine an averaged ratio; and
wherein the controller uses the averaged ratio as the initial ratio.

31. The system of claim 29 wherein the controller determines the drift of the sleep clock frequency during the sleep interval by dividing the nominal reference clock frequency by the product of the nominal sleep clock frequency times the ratio, minus one as follows:

$$\Delta f_{sleep} = f_{ref}/(f_{sleep} R) - 1.$$

32. The system of claim 31 wherein the controller determines the drift of the sleep clock frequency during the sleep interval by approximating the sleep clock frequency drift with a linear function including the ratio as follows:

$$\Delta f_{sleep} = (R - r_0)/b$$

where the ro and b are constants.

33. The system of claim 32 wherein the clock system includes a PN code sequence generator operating at a PN generator clock rate, proportionally related to the reference clock frequency; and     wherein the controller advances the system timing by shifting the phase of the PN code sequence.

34. The system of claim 33 wherein the searcher measures the reacquisition error by measuring the offset between the center of a searching window and correct timing position, $\delta c$; and     wherein the controller calculates the sleep clock frequency drift during the previous sleep period $T_{sleep}$ with a linear approximation of the function $\Delta f_{sleep}=f(\delta c)$, as follows:

$$\Delta f_{sleep}=(\delta c - c_0)/d$$

where $c_0$ and d are constants.

35. The system of claim 23 wherein the controller determines the ratio in response to a previous ratio and a current ratio.

36. The system of claim 35 wherein the controller, following the enabling of the reference clock frequency, measures the reacquisition error, and the controller determining the ratio by weighting the importance of current ratio and previous ratio in response to the reacquisition error.

37. The system of claim 36 wherein the controller performs a calibration measurement of the ratio over an extended period of time, and uses the calibration measurement as the initial ratio.

38. The system of claim 37 wherein the controller measures the ratio by averaging the number of rising and falling edges in the reference clock signal to determine an averaged ratio, and determines the current ratio by using the averaged ratio.

39. The system of claim 23 wherein the controller determines the ratio in response to a plurality of previous ratios and the current ratio.

40. In direct sequence spread spectrum (DSSS) communications, a method for recovering system timing, the method comprising:

disabling a reference clock during a sleep interval;

following the sleep interval, enabling the reference clock; and     modifying the system timing by a ratio, where the ratio is the reference clock frequency divided by a sleep clock frequency wherein the ratio is adjusted for frequency drift;

measuring a reacquisition error;

wherein calculating the ratio includes calculating the ratio in response to the reacquisition error; and wherein the ratio is further adjusted for quantization error.

41. In direct sequence spread spectrum (DSSS) communications, a method for recovering system timing, the method comprising:

disabling a reference clock during a sleep interval;

following the sleep interval, enabling the reference clock; and     modifying the system timing by a ratio, where the ratio is the reference clock frequency divided by a sleep clock frequency wherein the ratio is adjusted for frequency drift; and     applying an IIR filter to a current and a previous value of the ratio, whereby an error in the ratio is smoothed out; and wherein the ratio is further adjusted for quantization error.

42. In direct sequence spread spectrum (DSSS) communications, a method for recovering system timing, the method comprising:

measuring sleep clock frequency using an initial ratio;

disabling a reference clock during a sleep interval;

following the sleep interval, enabling the reference clock;

advancing the system timing in response to the initial ratio;

measuring the reference clock frequency and the sleep clock frequency, as adjusted for frequency drift, to supply a current ratio;

determining a ratio in response to a previous ratio and the current ratio; and     reducing a quantization error in the initial ratio by averaging both edges of the reference clock.

\* \* \* \* \*